(12) United States Patent
Yoshida et al.

(10) Patent No.: US 7,951,274 B2
(45) Date of Patent: May 31, 2011

(54) DIAMOND ELECTRODE, METHOD FOR PRODUCING SAME, AND ELECTROLYTIC CELL

(75) Inventors: Shigeru Yoshida, Itami (JP); Katsuhito Yoshida, Itami (JP); Toshiya Takahashi, Itami (JP); Takahisa Iguchi, Itami (JP); Fuminori Higuchi, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 429 days.

(21) Appl. No.: 12/093,087

(22) PCT Filed: Oct. 25, 2006

(86) PCT No.: PCT/JP2006/321264
§ 371 (c)(1),
(2), (4) Date: May 8, 2008

(87) PCT Pub. No.: WO2007/060807
PCT Pub. Date: May 31, 2007

(65) Prior Publication Data
US 2009/0301865 A1 Dec. 10, 2009

(30) Foreign Application Priority Data

Nov. 24, 2005 (JP) .................................. 2005-338642
Apr. 6, 2006 (JP) .................................. 2006-105493

(51) Int. Cl.
*C25B 11/12* (2006.01)
*C25B 11/02* (2006.01)
*C25B 11/03* (2006.01)
*C25B 11/04* (2006.01)
*C25B 11/06* (2006.01)

(52) U.S. Cl. .......................... 204/294; 204/283; 204/252
(58) Field of Classification Search .................. 204/294, 204/283, 252, 275.1, 278.5; 429/523, 532, 429/534, 479, 480, 483, 484
See application file for complete search history.

(56) References Cited

U.S. PATENT DOCUMENTS

| 4,039,409 A | 8/1977 | LaConti et al. |
| 5,900,127 A | 5/1999 | Iida et al. |
| 2003/0188764 A1 | 10/2003 | Haibara et al. |
| 2006/0216514 A1* | 9/2006 | Fujimura et al. ............. 428/408 |
| 2008/0053840 A1 | 3/2008 | Arihara et al. |
| 2010/0320082 A1* | 12/2010 | Kato et al. ................. 204/266 |

FOREIGN PATENT DOCUMENTS

| JP | 52-078788 A | 7/1977 |
| JP | 09-268395 A | 10/1997 |

(Continued)

OTHER PUBLICATIONS

Canadian Office Action for Canadian Application No. 2,630,792, mailed on Dec. 4, 2009 (2 pages).

(Continued)

*Primary Examiner* — Bruce F Bell
(74) *Attorney, Agent, or Firm* — Osha • Liang LLP (57) ABSTRACT

A diamond electrode includes a conductive silicon substrate having a plurality of pores. The diamond electrode also includes a conductive diamond covering the conductive silicon substrate. The inner wall surfaces of the plurality of pores are at an angle of 60° to 85° with respect to a substrate of the conductive silicon substrate.

10 Claims, 3 Drawing Sheets

FOREIGN PATENT DOCUMENTS

| | | |
|---|---|---|
| JP | 11-269686 | 10/1999 |
| JP | 2000-204492 | 7/2000 |
| JP | 2001-89887 | 4/2001 |
| JP | 2001-192874 A | 7/2001 |
| JP | 2001223204 | 8/2001 |
| JP | 2003-290767 | 10/2003 |
| JP | 2004-059342 | 2/2004 |
| JP | 2004-195346 | 7/2004 |
| JP | 2005-246279 | 9/2005 |
| JP | 2005-336607 A | 12/2005 |
| WO | 2005-106079 A1 | 11/2005 |

OTHER PUBLICATIONS esp@cenet patent abstract for Japanese Publication No. 2001089887, Publication date Apr. 3, 2001 (1 page).

esp@cenet patent abstract for Japanese Publication No. 11269686, Publication date Oct. 5, 1999 (1 page).

esp@cenet patent abstract for Japanese Publication No. 2000204492, Publication date Jul. 25, 2000 (1 page).

Chinese Office Action for Chinese Application No. 200680044105.0, mailed on Dec. 11, 2009 (13 pages).

Vladimir Gurau, et al., "Two-Dimensional Model for Proton Exchange Membrane Fuel Cells", AIChE Journal, vol. 44, No. 11, Nov. 1998, pp. 2410-2422 (13 pages).

esp@cenet patent abstract for Japanese Publication No. 2001223204, Publication date Aug. 17, 2001 (1 page).

N.G. Ferreira, et al., "Nanodiamond Films Growth on Porous Silicon Substrates for Electrochemical Applications", Diamond & Related Materials, 14 (2005), pp. 441-445 (5 pages).

International Search Report with English Translation from PCT/JP2006/321264 mailed Jan. 16, 2007 (4 pages).

English Abstract of Publication No. JP2005336607, dated Dec. 8, 2005, Tokai Ryokaku Tetsudo KK (1 page).

English Abstract of Publication No. JP9268395, dated Oct. 14, 1997, Permelec Electrode Ltd. (1 page).

English Abstract of Publication No. JP2001192874, dated Jul. 17, 2001, Permelec Electrode Ltd. (1 page).

English Abstract of Publication No. JP52078788, dated Jul. 2, 1977, Gen Electric (1 page).

Farrell, J. et al.; "Anodically Generated Short-Lived Species on Boron-Doped Diamond Film Electrodes"; J. Electrochem. Soc., 2005, vol. 152, Issue 1, pp. E14-E17, Abstract (2 pages).

Patent Abstracts of Japan, Publication No. 2003-290767 dated Oct. 14, 2003, Wacker NSCE Corp. et al., (1 page).

Patent Abstracts of Japan, Publication No. 2004-195346 dated Jul. 15, 2004, Permelec Electrode Ltd. (1 page).

Patent Abstracts of Japan, Publication No. 2004-059342 dated Feb. 26, 2004, Wacker NSCE Corp. et al., (1 page).

Patent Abstracts of Japan, Publication No. 2005-246279 dated Sep. 15, 2005, Denkai Giken:KK (1 page).

International Preliminary Report on Patentability from PCT/JP2006/321264 mailed Mar. 10, 2008 (4 pages).

Office Action in Japanese Application 2007-546380, Mailed Mar. 8, 2011 (5 pages Including English Translation).

* cited by examiner

DIAMOND ELECTRODE, METHOD FOR PRODUCING SAME, AND ELECTROLYTIC CELL

TECHNICAL FIELD

The present invention relates to a diamond electrode employed for sewage disposal or formation of functional water and a method for producing the same. The present invention also relates to an electrolytic cell employing this diamond electrode, employed for formation of ozone water or the like.

BACKGROUND ART

Electrolyzation (hereinafter referred to as "electrolysis") of water is performed for producing electrolytic water employed in the fields of medical care and food or for cleaning electronic components, or for wastewater treatment. For example, electrolysis of water is known as a method for producing water in which ozone is dissolved, i.e., the so-called ozone water.

The ozone water is a kind of functional water, has extremely strong oxidizing power, and is utilized in various fields of medical care, cleaning of electronic devices etc. as sterilizing water or cleaning water through the oxidizing power. In order to form ozone water by dissolving ozone gas in water, an apparatus for generating impurity-free ozone gas and dissolving the same in water is necessary, and the apparatus is increased in size and complicated, while it is difficult to obtain high-purity ozone water. According to a method for forming ozone water by electrolyzing pure water, however, the apparatus can be easily downsized, and high-purity ozone water can be easily obtained.

Lead dioxide, platinum or the like excellently functioning as a catalyst is known as the material for an electrode employed for this electrolysis. However, this material has a problem of elution of the electrode, and an apparatus for removing eluted metallic impurities must be provided when high-purity ozone water is required, to complicate the apparatus.

Therefore, a conductive diamond supplied with conductivity through addition of a dopant such as boron has recently been attracted attention as an electrode material substituting for the aforementioned material. The conductive diamond is chemically extremely stable, not eluted in electrolysis and has a wide potential window, whereby ozone can be electrolytically generated from pure water having high electrical resistance with an electrode (hereinafter referred to as "diamond electrode") employing this conductive diamond.

As this diamond electrode, Japanese Patent Laying-Open No. 2005-336607 (Patent Document 1), for example, discloses an electrode obtained by perforating and meshing a self-supporting membrane of diamond prepared by chemical vapor deposition (CVD) in order to increase the surface area of the electrode and improve electrolytic efficiency. However, a long synthesis time is required for preparing this diamond self-supporting membrane to result in a high cost, while the diamond self-supporting membrane is easily warped and easily forms a clearance between the same and an ion-exchange membrane. Further, the step of meshing the membrane with a laser also results in a high cost.

Therefore, a diamond electrode obtained by forming a membrane of conductive diamond on a meshed or porous substrate consisting of a valve metal such as titanium or niobium by CVD is proposed, and disclosed in Japanese Patent Laying-Open No. 9-268395 (Patent Document 2), Japanese Patent Laying-Open No. 2001-192874 (Patent Document 3) or the like, for example. However, the thermal expansion coefficient of the substrate consisting of titanium or niobium is remarkably different from that of diamond, whereby the electrode easily cause remarkable residual stress resulting from the difference in thermal expansion coefficient between the same and diamond when in use. Consequently, the conductive diamond and the substrate are easily separated from each other, to disadvantageously reduce the life of the electrode.

As a substrate for forming a diamond electrode by covering conductive diamond by CVD, a conductive silicon substrate is also known. The difference in thermal expansion coefficient between the conductive silicon substrate and diamond is relatively small, whereby the conductive silicon substrate has a small problem of separation resulting from residual stress. However, it is difficult to form a mesh structure with conductive silicon. In other words, while a substrate of a mesh structure can be easily produced by a method laterally pulling a flat plate provided with a large number of small pores in the case of titanium or niobium, this method cannot be applied to conductive silicon, and only a flat conductive silicon substrate has been present in general. Therefore, no porous diamond electrode employing a conductive silicon substrate has been obtained.

Patent Document 1: Japanese Patent Laying-Open No. 2005-336607
Patent Document 2: Japanese Patent Laying-Open No. 9-268395
Patent Document 3 Japanese Patent Laying-Open No. 2001-192874

DISCLOSURE OF THE INVENTION

Problems to be Solved by the Invention

An object of the present invention is to provide a diamond electrode prepared by covering a substrate with conductive diamond, having a low production cost, no problem of warping and a large electrode surface area, capable of obtaining high electrolytic efficiency, hardly causing separation between the conductive diamond (diamond cover layer) and the substrate and having a long practicable life and a method for producing the same.

Another object of the present invention is to provide an electrolytic cell allowing easy downsizing of an apparatus, using the diamond electrode according to the present invention, employed for formation of ozone water or the like for attaining high electrolytic efficiency and having a long practicable life.

Means for Solving the Problems

As a result of a deep study, the inventors have found that a plurality of pores can be formed in a flat silicon substrate by ion etching, solution etching with fluoronitric acid or sandblasting and that a diamond electrode capable of attaining high electrolytic efficiency and hardly causing separation between a diamond cover layer and a substrate can be obtained by covering the surface of a conductive silicon substrate having a plurality of pores formable in this manner with conductive diamond, and completed the present invention on the basis of this recognition.

The diamond electrode according to the present invention comprises a conductive silicon substrate having a plurality of pores and a conductive diamond covering this conductive silicon substrate.

Preferably in the diamond electrode according to the present invention, the said conductive diamond (1) covers at least 90% of the surfaces of the conductive silicon substrate, or (2) covers only a first surface of the conductive silicon substrate.

Preferably in the diamond electrode according to the present invention, the inner wall surfaces of the said plurality of pores are at an angle of 45° to 85° with respect to the substrate surface of the said conductive silicon substrate.

Preferably in the diamond electrode according to the present invention, the said plurality of pores have tapered inner walls, and the open area of the pores on a first substrate surface is smaller than the open area of the pores on a second substrate surface. More preferably, the open area ratio of the said plurality of pores is 3 to 80% on the respective substrate surfaces in this case.

Preferably in the diamond electrode according to the present invention, at least 60% of the said plurality of pores on each substrate surface have open areas in the range of difference of 10% from each other.

Preferably in the diamond electrode according to the present invention, the aspect ratio of the said plurality of pores is 0.2 to 3.

The present invention also provides a method for producing the aforementioned diamond electrode according to the present invention, including the step of covering the said conductive silicon substrate with the conductive diamond by chemical vapor deposition.

The present invention also provides an electrolytic cell comprising a cation-exchange membrane, an anode and a cathode provided in close contact with both surfaces of the said cation-exchange membrane respectively and collectors provided in contact with the said anode and the cathode in an electrically feedable manner, characterized in that at least the said anode is composed of the aforementioned diamond electrode according to the present invention, and the said collectors are composed of a conductive nonmetal allowing permeation of an electrolyte.

The present invention further provides an electrolytic cell comprising a diaphragm separating the cell into two chambers as well as an anode and a cathode provided in the first and second chambers separated by this diaphragm respectively, characterized in that the said anode is composed of the aforementioned diamond electrode according to the present invention.

Effects of the Invention

The diamond electrode according to the present invention has a low production cost and no problem of warping, c an obtain high electrolytic efficiency, hardly causes separation between a diamond cover layer constituting the same and the conductive silicon substrate, and has a long practicable life also in formation of ozone water or the like. This diamond electrode can be easily produced by the method according to the present invention. The electrolytic cell according to the present invention is an electrolytic cell allowing easy downsizing of an apparatus and has an electrode capable of attaining high electrolytic efficiency and a long life, whereby the same can be suitably employed for formation of ozone water by electrolysis of water or the like.

DESCRIPTION OF THE REFERENCE SIGNS 1, 11, 21 diamond electrode, 2, 22 conductive silicon substrate, 3, 12, 23 conductive diamond (diamond cover layer), 4, 24 pore, 31, 51 electrolytic cell, 32 cation-exchange membrane, 33 anode, 34 cathode, 35, 36 collector, 37 electrolytic cell case, 38, 40, 55, 56 inlet, 39, 41, 59, 60 outlet, 42, 43, 53, 54 lead wire, 52 diaphragm, 57, 58 electrolyte.

BEST MODES FOR CARRYING OUT THE INVENTION

Figure 1:
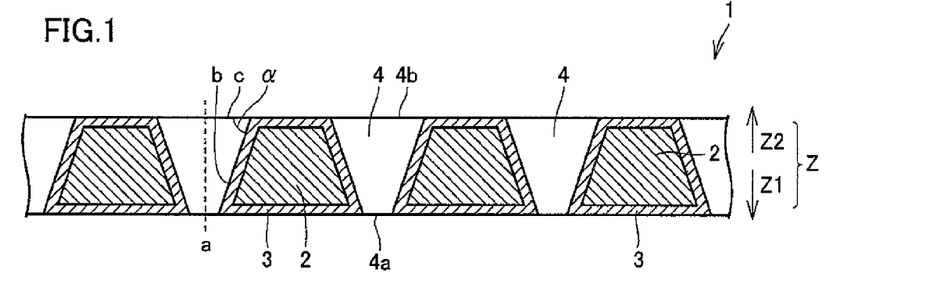
FIG. 1 is a sectional view schematically showing a preferred diamond electrode 1 according to the present invention.

FIG. 1 is a sectional view schematically showing an exemplary preferred diamond electrode 1 according to the present invention, and FIGS. 2(a) and 2(b) are a top plan view and a bottom plan view of diamond electrode 1 shown in FIG. 1 respectively. FIG. 1 is a sectional view taken along the cutting plane line I-I in FIG. 2(a). Diamond electrode 1 according to the present invention comprises a conductive silicon substrate 2 having a plurality of pores 4 and a conductive diamond (diamond cover layer) 3 covering conductive silicon substrate 2.

Conductive silicon substrate 2 in the present invention means a substrate consisting of silicon supplied with conductivity. "Conductivity" indicates that resistivity is not more than 20 Ω·cm (preferably not more than 1.0 Ω·cm). Such conductivity can be supplied by adding (doping) boron or the like to the substrate material. The thermal expansion coefficients of conductive silicon substrate 2 and the conductive diamond described later are relatively close to each other, whereby residual stress resulting from thermal expansion coefficient difference is reduced, separation of the diamond can be suppressed and a practicable long life can be attained by employing a substrate of conductive silicon as the substrate covered with the diamond.

Conductive silicon substrate 2 in the present invention has plurality of pores 4. While "plurality of" means at least two, conductive silicon substrate 2 according to the present invention specifically has a large number of pores of 0.1 to 100/cm$^2$ (more preferably, 0.5 to 10/cm$^2$), as shown in Examples described later. In diamond electrode 1 according to the present invention prepared by covering conductive silicon substrate 2 having such plurality of pores 4 with conductive diamond 3, the upper surface (FIG. 2(a)) and the lower surface (FIG. 2(b)) thereof are meshed.

A circular shape, a quadrangular shape such as a rhomboid shape, a triangular shape or another polygonal shape can be listed as the opening shape of pores 4 provided in conductive silicon substrate 2. While the opening shape may be an indeterminate shape or a mixture of these shapes, a shape enabling a formed gas to easily escape from the pores is preferable since contact between an electrolyte such as pure water and the electrode or the ion-exchange membrane is hindered, distribution is caused in electrolysis and the electrolytic efficiency is reduced if a gas, such as hydrogen gas, for example, formed by electrolytic reaction remains in pores 4.

Pores 4 can be formed by ion etching, solution etching with fluoronitric acid or sandblasting. The conductive silicon is hard to mesh by a method laterally pulling a flat plate provided with a large number of small pores dissimilarly to niobium or titanium, and it has generally been impossible to obtain a meshed or porous conductive silicon substrate. However, conductive silicon substrate 2 having the plurality of pores can be obtained by the aforementioned method, and diamond electrode 1 according to the present invention has been obtained.

Ion etching is a method for etching the substrate by colliding ions against the conductive silicon substrate. Solution etching with fluoronitric acid is a method for etching the conductive silicon substrate by dissolving silicon with a fluoronitric acid solution. Sandblasting is a method for mechanically polishing the substrate by colliding hard particles of alumina or the like against the conductive silicon substrate. The plurality of pores passing through the conductive silicon substrate in relation to the thickness direction thereof can be formed by employing any of these methods. More specifically, portions of the conductive silicon substrate other than those for forming the pores are covered with a mask, and ion etching, solution etching with fluoronitric acid or sandblasting is performed. A mask of resin or metal is illustrated as the mask. While ion etching, solution etching with fluoronitric acid or sandblasting is performed until through-holes are formed, the shape, the size, the open area ratio, the taper angle and the aspect ratio of the pores described later can be adjusted by varying the shape of the mask and the conditions for ion etching, solution etching with fluoronitric acid or sandblasting.

Conductive silicon substrate 2 in the present invention can be produced by employing a proper well-known unporous flat conductive silicon substrate (commercially available flat conductive silicon substrate, for example) used as a substrate for a diamond electrode and forming pores therein in the aforementioned method. While the ranges of the thickness and the size of conductive silicon substrate 2 in the present invention vary with the size of the electrode etc. and are not particularly restricted, a thickness causing no warping of the electrode (more specifically, in the range of 0.5 to 10 mm) is required.

Diamond electrode 1 according to the present invention is characterized in that the aforementioned conductive silicon substrate 2 is covered with conductive diamond 3. "Cover" means such a state that the diamond is chemically or physically in close contact with the silicon substrate to cover the same. In diamond electrode 1 according to the present invention, the surfaces of the conductive silicon substrate (including the inner wall surfaces of the pores, in addition to both main surfaces and the side surfaces of the substrate) are partially or entirely covered with the conductive diamond. In this specification, the layer of the conductive diamond covering the conductive silicon substrate is referred to as "diamond cover layer".

When all surfaces of the conductive silicon substrate are covered with the conductive diamond in the diamond electrode according to the present invention, the surface area of the diamond cover layer is increased due to the plurality of pores provided in the conductive silicon substrate, and electrolytic efficiency is improved. When only a surface (described later) so provided as to come into contact with the ion-exchange membrane is covered with the conductive diamond in both surfaces of the conductive silicon substrate, it follows that a plurality of three-phase contact portions of pure water (electrolyte), the ion-exchange membrane and the diamond electrode are formed due to the plurality of pores provided in the conductive silicon substrate, to enable electrolysis of pure water or the like having high electrical resistance. In this specification, the electrolyte means a liquid subjected to the electrolysis, and includes pure water or extrapure water having high electrical resistance.

The "conductivity" of the conductive diamond in the present invention indicates that the resistivity is not more than 20 Ω·cm (preferably not more than 1.0 Ω·cm), similarly to the aforementioned "conductivity" of the silicon substrate. Such conductivity is supplied by adding a dopant (impurity) to the diamond. While phosphorus, nitrogen, boron or sulfur can be listed as the dopant added to the diamond for supplying conductivity, the type thereof is no object if the same is an element having a valence different from that of carbon and capable of supplying conductivity. However, boron or phosphorus is added in general, and the content thereof is preferably 1 to 10000 ppm, more preferably 100 to 10000 ppm. Boron oxide or diphosphorus pentaoxide having small toxicity can be preferably used as the raw material for this added element.

While the thickness of diamond cover layer 3 in diamond electrode 1 according to the present invention varies with conditions, environment etc. for use of the electrode and is not particularly restricted, this thickness is preferably 3 to 100 μm in view of easiness in production and the cost. If the thickness of diamond cover layer 3 is less than 3 μm, there is a possibility that the silicon substrate is partially not covered with the diamond. If the thickness of diamond cover layer 3 exceeds 100 μm, on the other hand, the thickness may be excessive, to increase the cost.

In the diamond electrode according to the present invention, the conductive diamond preferably covers at least 90% of the surfaces of the conductive silicon substrate. When electrolyzing a conductive electrolyte such as an aqueous solution in which sulfuric acid, sodium sulfate, sodium carbonate or fluoric acid is dissolved, the diamond electrode is generally not provided in close contact with the ion-exchange membrane or the like but used in a state where all surfaces thereof are directly in contact with the conductive electrolyte. In this case, wider surfaces of the conductive silicon substrate are preferably covered with the conductive diamond, in order to improve the electrolytic efficiency. When the electrolyte is an aqueous fluoric acid solution or the like dissolving silicon, dissolution of silicon can be prevented by covering the surfaces of the conductive silicon substrate with the conductive diamond, and wider surfaces of the conductive silicon substrate are preferably covered with the conductive diamond also in such a point of view.

Figure 2:
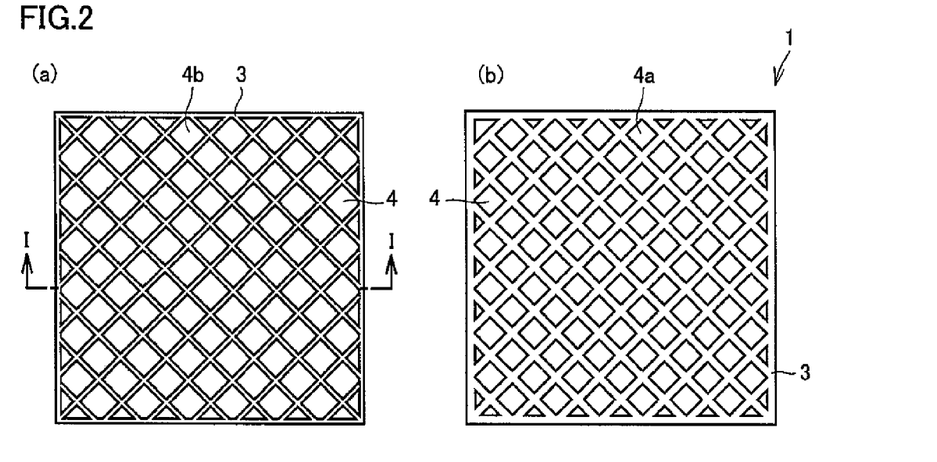
FIGS. 2(a) and 2(b) are a top plan view and a bottom plan view of diamond electrode 1 shown in FIG. 1.

More specifically, areas of at least 90% of the surfaces of the substrate are preferably covered, and all surfaces (100% of the surfaces) of conductive silicon substrate 2 are particularly preferably covered with diamond cover layer 3, as in the example shown in FIGS. 1 and 2.

Figure 3:
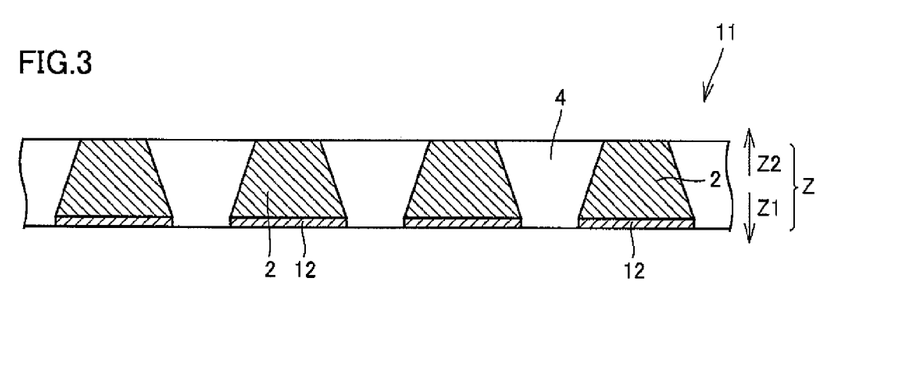
FIG. 3 is a sectional view schematically showing another exemplary preferred diamond electrode 11 according to the present invention.

FIG. 3 is a sectional view schematically showing another exemplary preferred diamond electrode 11 according to the present invention. Diamond electrode 11 of the example shown in FIG. 3 has a structure similar to that of diamond electrode 1 of the example shown in FIG. 1 except a part, and portions having similar structures are denoted by the same reference signs, to omit redundant description. Diamond electrode 11 of the example shown in FIG. 3 is characterized in that a conductive diamond (diamond cover layer 12) covers only a first surface (more specifically, only a surface of a first (Z1) side in a thickness direction Z of diamond electrode 11) of a conductive silicon substrate 2.

When an electrolyte is prepared from pure water or extra-pure water having high electrical resistance, the diamond electrode is so provided and used as to be in close contact with an ion-exchange membrane. As a method for directly forming ozone water by electrolyzing pure water or the like, for example, and an excellent method capable of easily downsizing an apparatus, a method for directly forming ozone water by electrolyzing pure water or the like with an electrolytic cell formed by holding an ion-exchange membrane between an anode and a cathode is disclosed in FIG. 2 etc. of Japanese Patent Laying-Open No. 52-78788. A diamond electrode employed for the anode or the like in this method disclosed in Japanese Patent Laying-Open No. 52-78788 is so provided and used as to be in close contact with the ion-exchange membrane.

As a result of a deep study, the inventors have found that, when the diamond electrode is so provided and used as to be in close contact with the ion-exchange membrane (i.e., in the case of electrolysis of pure water or the like having high electrical resistance), electrolytic reaction such as reaction of ozone generation is caused only on a zone (three phase zone) where the three phases of the ion-exchange membrane, the anode wall surface (surface exposing the conductive diamond) and the pure water are in contact with each other and a portion of the electrode not in contact with the ion-exchange membrane does not contribute to the reaction, whereby the electrode can sufficiently function as the electrode also when only the first surface of the conductive silicon substrate is covered with the conductive diamond.

Even when the conductive silicon substrate is directly in contact with the electrolyte, silicon is hardly dissolved in the electrolyte such as pure water when pure water or the like having high electrical resistance is electrolyzed, if the conductive silicon substrate is not in contact with the ion-exchange membrane. Therefore, diamond cover layer 12 is preferably so formed as to cover only the first surface of conductive silicon substrate 2 as in diamond electrode 11 of the example shown in FIG. 3, in consideration of easiness in production and the cost.

In diamond electrode 1 according to the present invention, the inner wall surfaces of the said plurality of pores 4 are preferably at an angle of 45° to 90° with respect to the said substrate surface. The angle (referred to as "taper angle" in this specification) of the inner wall surfaces with respect to the substrate surface is an angle (angle α in FIG. 1) formed by, on a section (surface perpendicular to the plane of FIG. 1) including a center line (center line a in FIG. 1) passing through each pore 4, a nodal line (nodal line b in FIG. 1) between this section and the inner wall and a plane (plane c in FIG. 1) extending the substrate surface (main surface) of conductive silicon substrate 2 to the opening of the pore.

Figure 4:
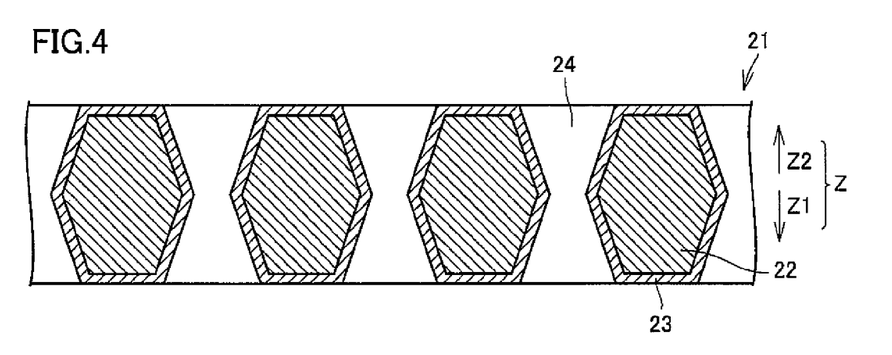
FIG. 4 is a sectional view schematically showing still another exemplary preferred diamond electrode 21 according to the present invention.

When pores 4 are tapered as described later (in the case of the example shown in FIG. 1 or 3), the difference between opening diameters of the pores on both main surfaces of the conductive silicon substrate is excessively increased if the taper angle is less than 45°, and penetration of the pores may generally be difficult when the larger opening diameter is set in a practical range. If the pores are shaped as shown in FIG. 4 (described later), sections of the pores at the center of the conductive substrate in the thickness direction may be so excessively reduced that it is difficult to discharge bubbles resulting from the electrolysis. If the taper angle exceeds 90°, on the other hand, the pores are unpreferably shaped to hinder discharge of the bubbles resulting from the electrolysis.

In diamond electrode 1 or 11 according to the present invention, the said taper angle is more preferably 60° to 85°. If the said taper angle is less than 60°, the difference between the opening diameters of the pores on both surfaces of the substrate is remarkable when the pores are tapered and the smaller opening diameter may generally be so excessively reduced that it is difficult to set the same to a practical size when the larger opening diameter is set in a practical range, while the sections of the pores at the center of the substrate in the thickness direction may be so small that bubbles resulting from the electrolysis hardly escape also when the pores are shaped as shown in FIG. 4 (described later). On the other hand, bubbles resulting from the electrolysis so hardly escape that the electrolytic efficiency tends to lower with respect to supplied power if the said taper angle exceeds 85°, and hence the said taper angle is preferably not more than 85°, in order to more effectively exhibit the function of the electrode. In the case of preparing the diamond electrode by covering all surfaces of the substrate with the conductive diamond, it is difficult to form the diamond cover layer on the inner wall surfaces by CVD and such a problem easily arises that the diamond cover layer on the inner wall surfaces is reduced in thickness or the inner wall surfaces are not entirely covered if the taper angle exceeds 85°. Therefore, the said taper angle is preferably not more than 85°, also in this point of view. More preferably, the taper angle is not more than 70°, or not more than 80°. FIGS. 1 to 3 show such cases that the inner walls of pores 4 are in contact with substrate surfaces on second sides Z2 in the thickness directions with taper angles of about 70°.

While the taper angles of all pores provided in the conductive silicon substrate are preferably in the aforementioned range in the diamond electrode according to the present invention, at least 70% of the pores provided in the conductive silicon substrate may be so implemented as to have at least the said taper angle. The diamond electrode according to the present invention having a plurality of pores having such a preferable taper angle can be produced by gradually engraving the conductive silicon substrate from the side of one surface by the aforementioned ion etching, solution etching with fluoronitric acid or sandblasting.

Preferably in diamond electrode 1 according to the present invention, the said plurality of pores 4 have tapered inner walls, and the open area of the pores on the first substrate surface is smaller than the open area of the pores on the second substrate surface. "Have tapered inner walls." means that the sectional area of the pores in a section parallel to the substrate surfaces increases from the first substrate surface toward the second substrate surface. The sectional shape of the pores is not restricted to a circular shape. Also when the sectional shape of the pores is a polygonal or indeterminate shape corresponding to the opening shape, the pores correspondingly "have tapered inner walls." if the sectional area increases from the first substrate surface toward the second substrate surface. FIGS. 1 to 3 show such examples that conductive silicon substrates 2 have tapered inner walls and the areas of openings 4a on first sides Z1 in the thickness directions are so implemented as to be smaller than the areas of openings 4b on second sides Z2 in the thickness directions. According to this structure bubbles resulting from the electrolysis easily escape, and high electrolytic efficiency is attained.

Pores 4 of conductive silicon substrate 2 have the aforementioned tapered inner walls, whereby bubbles formed in the electrolysis easily escape from the pores, no distribution is caused in the electrolysis, and the electrolytic efficiency with respect to the supplied power is improved. While the present invention also includes a diamond electrode 21 prepared by covering all surfaces of a conductive silicon substrate 22 having a plurality of pores 24 with a conductive diamond (diamond cover layer 23) so that pores 24 are formed narrower than both opening portions on the centers in the thickness direction thereof as shown in FIG. 4, for example, bubbles formed in electrolysis hardly escape from the pores and electrolytic efficiency tends to lower as compared with the examples shown in FIGS. 1 to 3 when the pores are not so shaped as to "have tapered inner walls" in this manner. Conductive silicon substrate 22 employed in the example of FIG. 4 can be produced by performing solution etching with fluoronitric acid or sandblasting on both surfaces of the conductive silicon substrate.

In the case of such a structure that diamond cover layer 12 covers only the first surface of conductive silicon substrate 2 as in the example shown in FIG. 3, the open areas of pores 4 are preferably so implemented as to be smaller on the side (first Z2 side in the thickness direction) of the main surface of the substrate covered with diamond cover layer 12 and to be larger on the opposite side (second Z2 side in the thickness direction). Thus, there are such advantages that bubbles formed on the three phase zone (zone where the three phases of diamond cover layer 12, the ion-exchange membrane and pure water are in contact with each other) easily escape from the pores into the electrolyte (pure water), no distribution is caused in the electrolysis, and the electrolytic efficiency with respect to the supplied power is improved.

When the open area of the pores on the first substrate surface is so implemented as to be smaller than the open area of the pores on the second substrate surface as described above, it is specifically more preferable that the larger open area is in the range of 3 to 80 mm$^2$ (more preferably in the range of 7 to 30 mm$^2$) and the smaller open area is in the range of 1.5 to 40 mm$^2$ (more preferably in the range of 3 to 20 mm$^2$).

The preferred diamond electrode according to the present invention in which the aforementioned plurality of pores 4 have tapered inner walls and the open area of the pores on the first substrate surface is smaller than the open area of the pores on the second substrate surface can be produced by performing the aforementioned ion etching, solution etching with fluoronitric acid or sandblasting from the side of one surface of the conductive silicon substrate.

In the diamond electrode according to the present invention, the open area ratio of the plurality of pores provided in the conductive silicon substrate is preferably 3 to 80% on the respective substrate surfaces (main surfaces). The "open area ratio" means the ratio of the total of the open areas of all pores present on the outer surface of the electrode with respect to the electrode area (area including the substrate main surfaces and the openings of the pores) when the outer surface of the electrode is regarded as a plane. If this open area ratio is 3 to 80% on each substrate surface, the electrolytic efficiency with respect to the supplied power is further increased, and the function as the electrode can be more efficiently exhibited. More preferably, the said open area ratio is 20 to 40% on the side having the smaller open area as described above, and 30 to 70% on the side having the large open area. When the pores have such open area ratios on the respective substrate surfaces respectively, higher electrolytic efficiency can be advantageously attained.

In the diamond electrode according to the present invention, the open areas of the plurality of pores on the respective substrate surfaces are preferably substantially identical to each other. In other words, it is preferable that at least 60% (more preferably at least 70%) of the openings of the said plurality of pores on the respective substrate surfaces have open areas different from each other by not more than 10% (more preferably not more than 7%). Thus, the volume of formation of ozone water or the like with respect to the supplied power can be easily controlled.

In the diamond electrode according to the present invention, the aspect ratio of the said plurality of pores is preferably in the range of 0.2 to 3. The "aspect ratio" is the ratio of the depth of the pores with respect to the opening diameter of the pores. The opening diameter means the diameter of the pores on the plane where the pores open if the pores are circular while the diameter of a circle having an area equal to the open area of the pores is regarded as the open area of the pores if the openings of the pores are not circular. While the open areas may be different from each other between both substrate surfaces in the diamond electrode according to the present invention, the said aspect ratio indicates a value with reference to the opening diameter on the side having the larger open area.

If the aspect ratio of the said pores exceeds 3 (in other words, the diameter of the pores is excessively small with respect to the thickness of the substrate), the pores are so deep that bubbles formed in the electrolysis hardly escape from the pores. Consequently, the electrolyte such as pure water hardly comes into contact with the conductive diamond, and the electrolytic efficiency tends to lower. If the aspect ratio of the said pores is less than 0.2, i.e., when the diameter of the pores is large with respect to the thickness of the substrate, on the other hand, the substrate tends to be easily broken when covered with the diamond. More preferably, the aspect ratio is 0.5 to not more than 2.0. FIGS. 1 to 3 show such examples that the aspect ratios with reference to the opening diameters on the second Z2 sides in the thickness directions are about 1.

The diamond electrode according to the present invention can be produced by covering the surfaces of the said conductive silicon substrate with the conductive diamond. Covering with the conductive diamond can be performed by chemical vapor deposition (CVD). The present invention also provides a method for producing this diamond electrode, including the step of covering the conductive silicon substrate with the conductive diamond by CVD, in addition to the aforementioned diamond electrode.

When producing the diamond electrode (shown in FIG. 1, 2 or 4, for example) according to the present invention prepared by covering all surfaces of the conductive silicon substrate with the conductive diamond, covering with the conductive diamond by CVD is preferably performed from the sides of both main surfaces of the conductive silicon substrate. In this case, covering may be simultaneously performed, or covering may be separately performed as to both main surfaces of the conductive silicon substrate. Thus, the inner wall surfaces of pores 4 can also be covered with the conductive diamond in a sufficient thickness.

When producing the diamond electrode (shown in FIG. 3, for example) prepared by covering only the first surface of the conductive silicon substrate with the conductive diamond, covering with the conductive diamond by CVD is preferably performed only from the first main surface (main surface on the first Z1 side in the thickness direction in the example shown in FIG. 3) of the conductive silicon substrate. Also when CVD is performed only from the first main surface of the conductive silicon substrate, pores 4 may be partially covered with the conductive diamond due to extension of reactive gas.

CVD in the method for producing a diamond electrode according to the present invention can be performed under conditions similar to those for well-known diamond covering by CVD. Hot filament CVD (chemical vapor deposition), microwave plasma CVD or the like can be listed as typical CVD.

Hot filament CVD can be performed by holding a carbon containing gas such as methane or alcohol serving as a carbon source in a reducing atmosphere of hydrogen gas or the like in which a substrate (conductive silicon substrate) for carrying diamond is set, heating the same to a temperature of 1800 to 2400° C. for forming carbon radicals and thereafter lowering the temperature of the reducing atmosphere to a level of 750 to 950° C. easily depositing diamond. The concentration of the carbon containing gas with respect to the hydrogen gas is preferably 0.1 to 10 volume %, while a supply speed of 0.01 to 1 l/min. and a pressure of 2000 to 100000 Pa are employed in general.

Microwave plasma CVD is a method employing hydrogen plasma generated by a microwave for etching a non-diamond component. The output of the plasma is preferably 1 to 5 kW, and a larger number of active species can be generated and the growth rate of diamond is increased as the output is increased. According to this method, a diamond film can be formed on a substrate having a large surface area at a high speed. The pressure in a chamber is 4000 to 15000 Pa, and an introduction flow rate of a gas mixture of hydrogen and the carbon source is preferably 10 to 100 ml/min. in general.

When the conductive silicon substrate is covered with the conductive diamond, pretreatment (for example, roughening of the conductive silicon substrate surfaces by blasting or seeding of applying nanodiamond particles having an average particle diameter of 1 to 50 nm onto the conductive silicon substrate with excellent dispersibility) is preferably so performed as to increase adhesiveness between the conductive silicon substrate and the diamond cover layer.

Figure 5:
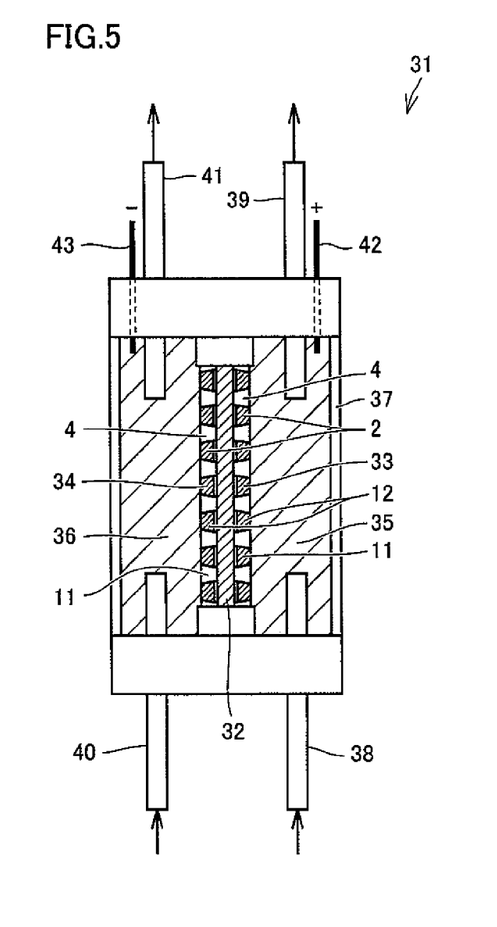
FIG. 5 is a sectional view schematically showing an exemplary preferred electrolytic cell 31 employing diamond electrode 11 according to the present invention.

FIG. 5 is a sectional view schematically showing an exemplary preferred electrolytic cell 31 employing the aforementioned diamond electrode 11 according to the present invention. The diamond electrode according to the present invention is employed as an electrode in electrolysis of various electrolytes such as a conductive electrolyte and an electrolyte such as pure water having high electrical resistance. Particularly in a case of an electrolytic cell for directly forming ozone water by electrolyzing pure water with an electrolytic cell constituted of an ion-exchange membrane as well as an anode and a cathode provided in close contact therewith, the diamond electrode according to the present invention covered with the conductive diamond only on the first substrate surface is preferably employed. FIG. 5 shows electrolytic cell 31 in the case of employing diamond electrode 11 of the aforementioned example shown in FIG. 3.

The present invention further provides an electrolytic cell employing the diamond electrode according to the present invention, in addition to the aforementioned diamond electrode and the method for producing the same. In other words, the electrolytic cell according to the present invention comprises a cation-exchange membrane, an anode and a cathode provided on both surfaces of the said cation-exchange film respectively and collectors provided in contact with the said anode and the cathode in an electrically feedable manner, and is characterized in that at least the said anode is the aforementioned diamond electrode according to the present invention and the said collectors are composed of a conductive non-metal allowing permeation of an electrolyte.

While pure water or extrapure water has high electrical resistance and is hard to electrolyze as such, electrolysis is enabled by providing the anode and cathode in contact with the respective surfaces of the cation-exchange membrane. While the type of this cation-exchange membrane is not particularly restricted so far as the same is a membrane having cation exchangeability, a perfluorosulfonic acid-based fluororesin type membrane is desirable. For example, a cation-exchange membrane Nafion No. 110 (by E. I. du Pont de Nemours and Company) can be Listed as a preferable specific example. The cation-exchange membrane also functions as a diaphragm.

The electrolytic cell according to the present invention is characterized in that at least the anode is formed by the diamond electrode according to the present invention. The diamond electrode has a large overvoltage as to hydroelectrolysis and the optimum oxidation, whereby the electrolytic efficiency can be further improved by employing the same as the anode. Further, the diamond electrode according to the present invention has the plurality of pores, thereby forming contact portions of water, the cation-exchange membrane and the conductive diamond and enabling electrolysis of pure water or the like. Particularly when employing the diamond electrode covered with the conductive diamond only on the first substrate surface, the production cost thereof is low and the electrolytic efficiency is preferably not reduced.

The diamond electrode has high chemical stability and is hardly consumed by electrolysis, and an element dissolved in water is not metal but carbon even if slight consumption takes place, whereby formed ozone water or the like can be used also for cleaning an electronic device or the like with no problem. Thus, the diamond electrode has high chemical stability and causes no mixing of a metal, and hence the cathode is preferably also formed by this diamond electrode.

FIG. 5 shows electrolytic cell 31 comprising a cation-exchange membrane 32 as well as an anode 33 and a cathode 34 provided in close contact with cation-exchange membrane 32 in a case of employing diamond electrode 11 of the aforementioned example shown in FIG. 3 as anode 33 and cathode 34. In other words, each of anode 33 and cathode 34 employed in electrolytic cell 31 of the example shown in FIG. 5 comprises the structure (FIG. 3) constituted of conductive silicon substrate 2 having plurality of pores 4 of tapered inner walls and diamond cover layer 12 covering only the first surface of conductive silicon substrate 2. In the example shown in FIG. 5, anode 33 and cathode 34 are so provided that the sides covered with diamond cover layers 12 are in close contact with cation-exchange membrane 32.

In electrolytic cell 31 of the example shown in FIG. 5, anode 33 and cathode 34 are provided in close contact with cation-exchange membrane 32. "Close contact" means a state where the anode and the cathode are directly in contact with the cation-exchange membrane. The anode and the cathode may not be provided directly in contact with the cation-exchange membrane, but films may be formed between the anode, the cathode and the cation-exchange membrane by applying an ion-exchange resin liquid such as a Nafion dispersion and baking the same at 150° C. to 350° C. These films function as buffer materials in the electrolytic cell, can more excellently bring the electrodes and the cation-exchange membrane, bring the same closely and homogeneously into contact with each other, and further improve the function of the electrodes.

In electrolytic cell 31 of the example shown in FIG. 5, an anode chamber and a cathode chamber are formed on the side provided with anode 33 and the side provided with cathode 34 respectively around cation-exchange membrane 32, while a collector 35 is provided in the anode chamber and a collector 36 is provided in the cathode chamber in contact with anode 33 and cathode 34 in an electrically feedable manner respectively. Collectors 35 and 36 have a function of holding the electrodes, and power is fed to the respective electrodes in electrolysis through these collectors. Power can be uniformly fed to anode 33 and cathode 34 by bringing anode 33 and cathode 34 which are diamond electrodes into contact with conductive collectors 35 and 36 respectively and feeding power to collectors 35 and 36.

Electrolytic cell 31 according to the present invention is also characterized in that collectors 35 and 36 are composed of a conductive nonmetal allowing permeation of an electrolyte. Collectors 35 and 36 made of the conductive nonmetal are so employed as to cause no problem of metal mixing into ozone water or the like. The electrolyte such as pure water subjected to electrolysis is generally fed to the outer sides of the respective electrodes through these collectors. Therefore, the collectors are preferably porous substances allowing permeation of the electrolyte such as pure water.

Collectors of carbon can preferably be listed as conductors of such a conductive nonmetal. While the diamond electrode according to the present invention obtained by covering the conductive silicon substrate having the plurality of pores with the conductive diamond is so fragile that the same may be broken when assembled into an electrolytic cell or the like, porous collectors of carbon have elasticity and low hardness, whereby breakage of the diamond electrodes assembled into the electrolytic cell is suppressed.

Among the collectors of carbon, a molded body of graphite hard to degrade and excellent in conductivity is more preferable. A material impregnated with fluororesin such as polytetrafluoroethylene resin (PTFE) in order to prevent degradation of carbon may be employed, or a material obtained by adding PTFE to graphite particles as a binder and molding the same may be employed. While the volume of PTFE in such a case is not particularly restricted, a volume of at least 10 weight % is generally preferable in order to obtain sufficient adhesive force, and a volume of not more than 30 weight % is preferable in order not to reduce conductivity.

Electrolytic cell 31 according to the present invention can be produced by mounting a substance obtained by further holding and fixing anode 33 and cathode 34 holding cation-exchange membrane 32 therebetween with collectors 35 and 36 from the outer sides and integrating the same with each other in an electrolytic cell case 37. While electrolytic cell case 37 employed for electrolytic cell 31 according to the present invention is not particularly restricted as to the material therefor, the same is preferably made of carbon. The electrolytic cell case may be integrated with the collectors. In a case of employing an electrolytic cell case of a metal, it is preferable to perform fluororesin treatment or the like on the metal portion for cutting off contact between the electrolyte and the metal portion, in order to prevent mixing of the metal component.

While the films obtained by applying the ion-exchange resin liquid and baking the same function as buffer materials in the electrolytic cell as described above, flexible packing materials of graphite or the like can be held between the electrolytic cell case and the used collectors if the films are considered as insufficient as the buffer materials.

The overvoltage of a carbon material such as graphite is by far smaller than that of the diamond electrode, whereby a conductive electrolyte cannot be electrolyzed through the diamond electrodes if the same is employed for the collectors or other electrolytic cell structure (such as the electrolytic cell case). If the electrolyte is pure water or extrapure water having high electrical resistance, however, electrolysis is performed only on the portions where the cation-exchange membrane and the electrodes are in contact with each other, whereby target reaction can be obtained also in this structure.

In the example shown in FIG. 5, an inlet 38 and an outlet 39 are provided on the lower end and the upper end of collector 35 provided in the anode chamber respectively, while an inlet 40 and an outlet 41 are provided on the lower end and the upper end of collector 36 provided in the cathode chamber respectively. In a case of formation of ozone water by electrolysis of pure water, pure water is supplied into collectors 35 and 36 from inlets 38 and 40 respectively. Collectors 35 and 36 are preferably porous, whereby the pure water supplied from inlets 38 and 40 passes therethrough, and electrolysis is performed by power fed to anode 33 and cathode 34 through collectors 35 and 36. Oxidized water such as ozone water having a high oxidation-reduction potential and reduced water having a low oxidation-reduction potential are formed on the sides of anode 33 and cathode 34, and extracted from outlets 39 and 41 respectively.

Lead wires 42 and 43 are mounted on collectors 35 and 36 respectively, and voltages are externally applied to lead wires 42 and 43. Collectors 35 and 36 have conductivity, whereby power is uniformly fed to anode 33 and cathode 34 through these.

In the electrolytic cell used for electrolysis of a conductive electrolyte, the diamond electrode (shown in FIG. 1, for example) according to the present invention in which all surfaces of the conductive silicon substrate are covered with the conductive diamond is preferably employed. Such a diamond electrode is preferably employed particularly as the anode. In this case, each diamond electrode is provided without in close contact with the cation-exchange membrane, and electrolytic reaction is caused on the surface of the diamond electrode covering all surfaces of the conductive silicon substrate.

Figure 6:
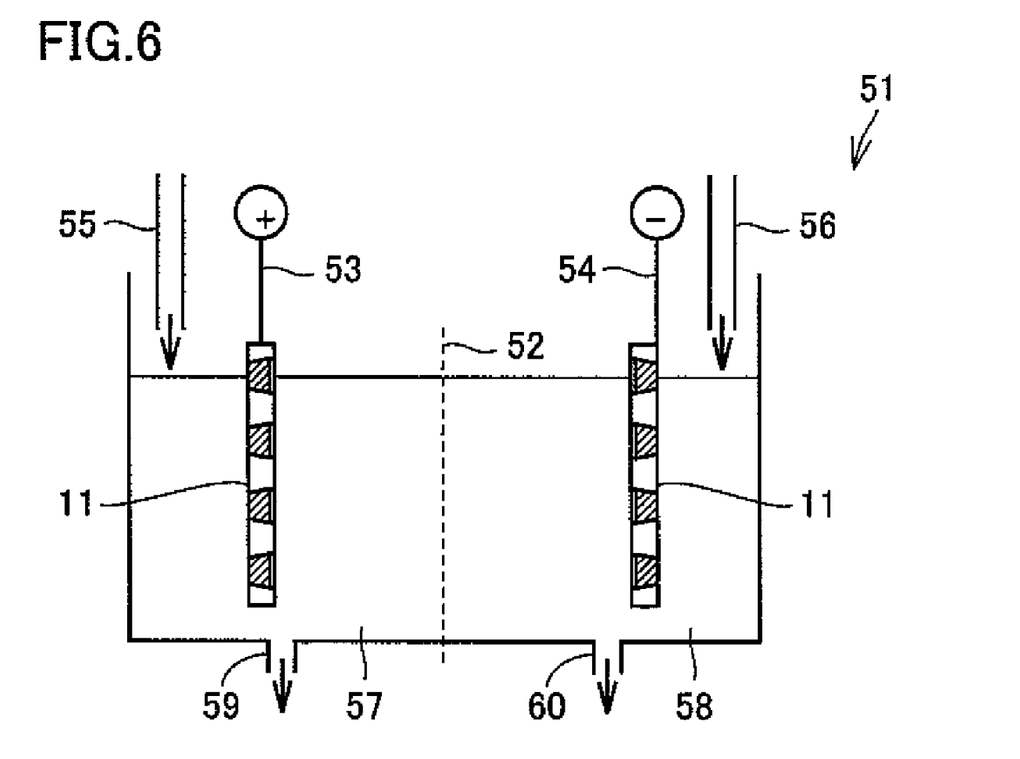
FIG. 6 is a sectional view schematically showing another exemplary preferred electrolytic cell 51 employing diamond electrode 11 according to the present invention.

FIG. 6 is a sectional view schematically showing another exemplary preferred electrolytic cell 51 employing diamond electrode 11 according to the present invention. The present invention also provides an electrolytic cell comprising a diaphragm separating the cell into two chambers as well as an anode and a cathode provided in the first chamber (anode chamber) and the second chamber (cathode chamber) separated by the diaphragm, characterized in that the said anode is composed of the aforementioned diamond electrode according to the present invention. Thus, the diamond electrode according to the present invention is also employed as an anode of the so-called two-chamber electrolytic cell. In this two-chamber electrolytic cell, the aforementioned diamond electrode according to the present invention may be further employed as the cathode.

In the present invention, the cation-exchange membrane can be implemented by making the same function as the diaphragm separating the cell into the anode chamber and the cathode chamber as in this two-chamber electrolytic cell of the example shown in FIG. 6. In this case, electrolytes are so separately supplied to the anode chamber and the cathode chamber that strong oxidative water such as ozone water having a high ORP (oxidation-reduction potential) is obtained from the anode chamber while the so-called reduced water having a low ORP is obtained from the cathode chamber. In electrolytic cell 51 of the example shown in FIG. 6, the cell is separated into two chambers (an anode chamber and a cathode chamber) by a diaphragm 52, and the aforementioned diamond electrodes 11 according to the present invention are provided in the respective chambers in states electrically connected with lead wires 53 and 54, and dipped in electrolytes 57 and 58 supplied from inlets 55 and 56 respectively. Further, electrolytic cell 51 of the example shown in FIG. 6 comprises outlets 59 and 60 for discharging electrolyzed water from the respective chambers respectively, and electrolyzed electrolytes 57 and 58 are implemented to be extracted from outlets 59 and 60 respectively as strong oxidative water and reduced water respectively.

While the present invention is now described in more detail with reference to Experimental Examples, the present invention is not restricted to these.

Experimental Example 1

A perforated substrate was prepared by working a conductive silicon substrate (P-type silicon single-crystalline substrate) 50 mm square in size and 3 mm in thickness with a fluoronitric acid solution for forming a plurality of pores from a single surface to be arranged in a staggered manner (pores having an opening diameter of 2 mm on the worked surface were formed in staggered arrangement at a pitch of 3 mm). In this working, regions other than the portions (opening portions) provided with the pores were resin-masked by resist treatment generally employed in a semiconductor fabrication process. The worked surface subjected to fluoronitric acid treatment was regarded as a surface A, and another surface so worked that the pores pass through the substrate toward the outer surface was regarded as a surface B.

Perforated substrates having various pore sizes (pore diameters), taper angles, aspect ratios and open area ratios were prepared by varying working conditions (samples Nos. 1 to 10). Thereafter the surface B of each substrate was covered with a conductive diamond having a boron concentration of 1000 ppm by hot filament CVD to have a thickness of 20 μm on the surface B, for preparing a diamond electrode. Table 1 shows the pore diameters, the taper angles, the aspect ratios and the open area ratios of the respective samples.

TABLE 1

| Sample No. | Pore Diameter A (mm) | Taper Angle (°) | Aspect Ratio | Pore Diameter B (mm) | Open Area Ratio (%) |
|---|---|---|---|---|---|
| 1 | 2.0 | 80 | 1.50 | 0.9 | 6 |
| 2 | 3.0 | 70 | 1.00 | 0.8 | 3 |
| 3 | 3.0 | 80 | 1.00 | 1.9 | 17 |
| 4 | 4.0 | 70 | 0.75 | 1.8 | 10 |
| 5 | 4.0 | 80 | 0.75 | 2.9 | 27 |
| 6 | 5.0 | 70 | 0.60 | 2.8 | 16 |
| 7 | 5.0 | 80 | 0.60 | 3.9 | 31 |
| 8 | 5.0 | 85 | 0.60 | 4.5 | 40 |
| 9 | 3.0 | 90 | 1.00 | 3.0 | 41 |
| 10 | 4.0 | 90 | 0.75 | 4.0 | 50 |

Each of the samples Nos. 1 to 10 is a diamond electrode (in other words, the diamond electrode according to the present invention) comprising a conductive silicon substrate having a plurality of pores and a conductive diamond covering only a first surface (surface B), and it is understood that such a diamond electrode is obtained by the aforementioned method.

The pore diameter A shown in Table 1 (and Table 3 described later) denotes the diameter of the pores on the surface A, and the pore diameter B denotes the diameter of the pores on the surface B. The aspect ratio is expressed in the ratio of the substrate thickness to the diameter of the pores on the surface A. The open area ratio denotes the ratio of the total of the open areas of the pores on the surface B with respect to the area when the surface B is regarded as a plane. The pore diameter A ≧ the pore diameter B due to the characteristic of the employed perforation.

Experimental Example 2

Samples of the electrolytic cell shown in FIG. 5 were prepared by employing the respective samples Nos. 1 to 10 prepared in Experimental Example 1 as anodes and cathodes. Pure water was electrolyzed through each electrolytic cell, for conducting an ozone generation experiment. A sulfonic acid-based ion-exchange membrane was used as an ion-exchange membrane, and current density was set to a condition of 1 A/cm$^2$. Porous graphite plates were employed as collectors. Ozone generation efficiency was measured by a KI method. Table 2 shows the results.

TABLE 2

| Sample No. | Open Area Ratio (%) | Ozone Generation Efficiency (%) |
|---|---|---|
| 1 | 6 | 6 |
| 2 | 3 | 5 |
| 3 | 17 | 14 |
| 4 | 10 | 10 |
| 5 | 27 | 16 |
| 6 | 16 | 13 |
| 7 | 31 | 20 |
| 8 | 40 | 25 |
| 9 | 41 | 4 |
| 10 | 50 | 6 |

As obvious from Table 2, generation of ozone is recognized whichever diamond electrode is employed, and it is understood that the electrolytic cell can be used for production of ozone water by electrolyzing pure water. In relation to the samples Nos. 1 to 8 having taper angles of 70 to 85°, higher ozone generation efficiency was obtained as the open area ratios were increased in the range of open area ratios of 2 to 31%, as obvious from Table 2. From the results shown in Table 2, further, it is understood that practically desired ozone efficiency of at least 5% can be obtained when setting the open area ratio to at least 3%.

On the other hand, the samples Nos. 9 and 10 exhibit open area ratios of 41% and 50% respectively, while ozone generation efficiency thereof is substantially identical to that of the sample No. 2 having the open area ratio of 3%. This is conceivably because bubbles formed in electrolysis hardly escape from the pores since the taper angles of the pores exceed 85°, and the bubbles collected in the pores inhibit the electrolysis.

Experimental Example 3

Diamond electrodes having various pore diameters, taper angles, aspect ratios and open area ratios were prepared similarly to Experimental Example 1, except that covering with conductive diamonds through hot filament CVD was performed not only from surfaces B of substrates but also from surfaces A for covering all of the surfaces A and the surfaces B of the substrates and inner wall surfaces of pores with the conductive diamonds (samples Ns. 11 to 22). Table 3 shows the respective pore diameters (on surfaces A), taper angles, aspect ratios and open area ratios. The average thicknesses of the conductive diamonds on the inner walls of the respective samples were measured by observing sections with an SEM. Table 3 also shows the results.

TABLE 3

| Sample No. | Pore Diameter A (mm) | Taper Angle (°) | Aspect Ratio | Open Area Ratio (%) | Thickness of Conductive Diamond on Inner Wall (μm) |
|---|---|---|---|---|---|
| 11 | 1.5 | 70 | 2.0 | 2 | 5 |
| 12 | 2.0 | 70 | 1.5 | 7 | 15 |
| 13 | 2.0 | 70 | 1.5 | 11 | 15 |
| 14 | 2.0 | 70 | 1.5 | 15 | 15 |
| 15 | 2.0 | 80 | 1.5 | 28 | 8 |
| 16 | 3.0 | 70 | 1.0 | 21 | 18 |
| 17 | 3.0 | 80 | 1.0 | 35 | 12 |
| 18 | 5.0 | 70 | 0.6 | 30 | 18 |
| 19 | 1.5 | 86 | 2.0 | 35 | 1 (not entirely covered) |
| 20 | 2.0 | 90 | 1.5 | 52 | 1 (not entirely covered) |
| 21 | 3.0 | 90 | 1.0 | 52 | 2 (not entirely covered) |
| 22 | 5.0 | 90 | 0.6 | 49 | 2 (not entirely covered) |

Each of the samples Nos. 11 to 22 is a diamond electrode (in other words, the diamond electrode according to the present invention) comprising a conductive silicon substrate having a plurality of pores and a conductive diamond covering the surfaces thereof and it is understood that such a diamond electrode is obtained by the aforementioned method. As obvious from Table 3, the inner walls are not covered with conductive diamonds of sufficient thicknesses in the samples Nos. 19 to 22 having taper angles exceeding 86°. In other words, it is understood from the results shown in Table 3 that the taper angle is preferably not more than 85°, in order to prepare a diamond electrode having a conductive silicon substrate covered with a conductive diamond in all surfaces.

Experimental Example 4

Samples of the electrolytic cell shown in FIG. 5 were prepared by employing the samples Nos. 11 to 22 prepared in Experimental Example 3 as anodes and cathodes. Pure water was electrolyzed through each electrolytic cell, for conducting an ozone generation experiment. A cation-exchange membrane, nonmetal collectors, a current density and a method for measuring ozone generation efficiency are similar to those in the case of Experimental Example 2.

Also as to the diamond electrode (sample No. 23) shown in FIG. 4 having the pores spreading in the directions of both opposed substrate surfaces with the open area ratios of 10% on both surfaces, an electrolytic cell employing the same as an anode and a cathode was prepared and an ozone generation experiment was similarly conducted. The diamond electrode of the sample No. 23 also comprises a conductive silicon substrate and a conductive diamond covering the surfaces thereof and the inner walls of pores. Table 4 shows ozone generation efficiency levels in cases of using the respective electrodes.

TABLE 4

| Sample No. | Open Area Ratio (%) | Ozone Generation Efficiency (%) |
|---|---|---|
| 11 | 2 | 3 |
| 12 | 7 | 6 |
| 13 | 11 | 8 |
| 14 | 15 | 10 |
| 15 | 28 | 15 |
| 16 | 21 | 13 |
| 17 | 35 | 20 |
| 18 | 30 | 17 |
| 23 | 10 | 4 |

As obvious from Table 4, higher ozone generation efficiency was obtained as the open area ratios were increased in the range of the open area ratios of 2 to 35% in relation to the samples Nos. 11 to 18. Comparing the ozone generation efficiency levels of the samples Nos. 12 and 13 having the open area ratios of about 10% and the sample No. 23, the ozone generation efficiency of the sample No. 23 is about half those of the samples Nos. 12 and 13. This is conceivably because the open areas on both surfaces are substantially identical to each other in the sample No. 23, and hence bubbles formed in electrolysis hardly escape from the pores, and bubbles collected in the pores inhibit the electrolysis. In other words, it is shown that the case where the pores have tapered inner walls (unidirectional taper) and the open area on the first side is larger than the open area on the second side is more preferable.

Experimental Example 5

A perforated substrate was prepared by working a conductive silicon substrate with a fluoronitric acid solution for forming a plurality of pores from a single surface to be arranged in a staggered manner (pores having an opening diameter of 2 mm on the worked surface were formed in staggered arrangement at a pitch of 3 mm). In this working, regions other than the portions (opening portions) provided with the pores were resin-masked by resist treatment generally employed in a semiconductor fabrication process.

The surface of the obtained perforated substrate opposite to the worked surface was covered with a conductive diamond of about 10 μm in thickness doped with 2500 ppm of boron by hot filament CVD, for preparing a diamond electrode.

Two diamond electrodes obtained in this manner were provided in close contact with both surfaces of a cation-exchange membrane. A perfluorocarbonsulfonic acid-type ion-exchange membrane Nafion No. 110 (by E. I. du Pont de Nemours and Company) was employed as the cation-exchange membrane as a hydrogen type.

An aqueous PTFE solution E30 (by E. I. du Pont de Nemours and Company) corresponding to 15 weight % of graphite was kneaded into graphite powder and molded into a platelike body having grooves of 2 mm in width and 1 mm in depth formed on a single surface at intervals of 1 mm, and the molded body was sintered at 320° C. for 15 minutes with pressurization at 1 kg/cm², for forming a nonmetal collector. The said cation-exchange membrane was held by two collectors and set in an electrolytic cell case prepared by hollowing out graphite, for obtaining the electrolytic cell shown in FIG. 5.

Electrolysis was performed by feeding power while feeding ultrapure water to an anode side and a cathode side. An operating temperature was set to 25° C., and the electrolysis was performed at a current density of 0.5 A/cm$^2$. Thus, hydrogen water of ORP=not more than −300 mV was obtained on the cathode side. Further, ozone water slightly containing hydrogen peroxide was obtained from the cathode side. The ozone water concentration was 9 to 11 ppm, and electrolytic efficiency corresponded to 6%. No mixing of a metallic component was observed in the ozone water obtained from the anode side and the hydrogen water on the cathode side.

The embodiments and Experimental Examples disclosed this time must be considered as illustrative in all points and not restrictive. The range of the present invention is shown not by the above description but by the scope of claims for patent, and it is intended that all modifications within the meaning and range equivalent to the scope of claims for patent are included.

The invention claimed is:

1. A diamond electrode comprising
    a conductive silicon substrate having a plurality of pores, wherein the plurality of pores pass through the substrate; and
    a conductive diamond covering said conductive silicon substrate wherein the inner wall surfaces of said plurality of pores are at an angle of 60° to 85° with respect to a substrate of said conductive silicon substrate.

2. The diamond electrode according to claim 1, wherein said conductive diamond covers at least 90% of the surfaces of said conductive silicon substrate.

3. The diamond electrode according to claim 1, wherein said conductive diamond covers only a first surface of said conductive silicon substrate.

4. The diamond electrode according to claim 1, wherein said plurality of pores have tapered inner walls, and the open area of the pores on a first substrate surface is smaller than the open area of the pores on a second substrate surface.

5. The diamond electrode according to claim 4, wherein the open area ratio of said plurality of pores is 3 to 80% on the respective substrate surfaces.

6. The diamond electrode according to claim 1, wherein at least 60% of said plurality of pores on each substrate surface have open areas different from each other by not more than 10%.

7. The diamond electrode according to claim 1, wherein the aspect ratio of said plurality of pores is 0.2 to 3.

8. A method for producing the diamond electrode according to claim 1, including the step of covering said conductive silicon substrate with the conductive diamond by chemical vapor deposition.

9. An electrolytic cell comprising:
    a cation-exchange membrane;
    an anode and a cathode provided in close contact with both surfaces of said cation-exchange membrane respectively; and
    collectors provided in contact with said anode and said cathode in an electrically feedable manner, wherein
    at least said anode is composed of the diamond electrode according to claim 1, and said collectors are composed of a conductive nonmetal allowing permeation of an electrolyte.

10. An electrolytic cell comprising a diaphragm separating the cell into two chambers as well as an anode and a cathode provided in the first and second chambers separated by said diaphragm respectively, wherein said anode is composed of the diamond electrode according to claim 1.

* * * * *